(12) United States Patent
Zheng

(10) Patent No.: US 11,043,029 B1
(45) Date of Patent: *Jun. 22, 2021

(54) VIRTUAL REALITY SYSTEM

(71) Applicant: Lesoft Technology (Beijing) Co., LTD., Beijing (CN)

(72) Inventor: Wei Zheng, Beijing (CN)

(73) Assignee: LESOFT TECHNOLOGY (BEIJING) CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/729,459

(22) Filed: Dec. 29, 2019

(30) Foreign Application Priority Data

Dec. 9, 2019 (CN) .......................... 201911247722.6

(51) Int. Cl.
G06T 19/00 (2011.01)
G08G 9/02 (2006.01)

(52) U.S. Cl.
CPC ............. *G06T 19/003* (2013.01); *G08G 9/02* (2013.01)

(58) Field of Classification Search
CPC .................................................... G06T 19/003
See application file for complete search history.

(56) References Cited

U.S. PATENT DOCUMENTS

| 2010/0245233 | A1* | 9/2010 | Hammarling | G06T 19/003 345/156 |
| 2017/0193705 | A1* | 7/2017 | Mullins | G06T 19/003 |
| 2018/0061125 | A1* | 3/2018 | Xia | G06T 19/003 |
| 2018/0149481 | A1* | 5/2018 | Hirai | G06T 19/003 |

* cited by examiner

*Primary Examiner* — Mark K Zimmerman
*Assistant Examiner* — Jonathan M Cofino
(74) *Attorney, Agent, or Firm* — Cheng-Ju Chiang

(57) ABSTRACT

A system of virtual reality includes a roaming path control unit, where the roaming path control unit includes a decomposing processing module, a tagging processing module, a setting processing module, a control processing module and a roaming path generating module, where the control processing module is configured to, detect a tag of a passing grid cell from a start point of the roaming path when a roamer roams in the virtual passage, if the passing grid cell is tagged as an impassable cell, then select another grid cell for re-detection; if the passing grid cell is tagged as a passable cell, then further detect whether the roamer is the preset roaming object, according to the roaming control label for the passable cell, if not, then select another grid cell for re-detection, if yes, then determine to be passable and continue to select the next passing grid cell for detection.

3 Claims, 3 Drawing Sheets

| serial number | attribute value |
|---|---|
| roaming control label 1 | 0 |
| roaming control label 2 | 1 |
| roaming control label 3 | 1 |

VIRTUAL REALITY SYSTEM

CROSS REFERENCE TO RELATED APPLICATION

This application claims priority to Chinese Patent Application No. 201911247722.6, filed on Dec. 9, 2019, the entire content of which is incorporated herein by reference for all purposes.

TECHNICAL FIELD

The present disclosure relates to the field of virtual reality technology, and more particularly, to a virtual reality system.

BACKGROUND

Virtual Reality (VR) technology, also known as Spirit Realm technology, incorporates computer, electronic information and simulation technologies, and the basic way of implementing VR is to simulate virtual environment with a computer to give people a sense of environmental immersion. In a virtual reality system, a virtual character roams in a virtual passage, but not all the virtual passage roamers in the VR system can roam, that is, the roaming path of the roamer needs to be controlled. In the prior art, roaming path control in a virtual reality system is implemented in a modeling manner, that is, when a model layer is constructed, a new layer is created, a passable area is arranged in the new layer, and roaming is controlled according to the passable area of the new layer. However, the modeling manner adopted by such a technology is complex and has higher requirements for computer hardware.

SUMMARY

The technical problem to be solved in various embodiments of the present disclosure is to provide a virtual reality system for implementing roaming path control, which has lower requirements for computer hardware and relatively simple roaming path control manner.

To solve the above technical problem, the technical solutions according to various embodiments of the present disclosure are as follows:

Provided is a virtual reality system including a roaming path control unit, where the roaming path control unit includes:

a decomposing processing module, configured to decompose a virtual passage into various grid cells;

a tagging processing module, configured to tag the grid cells as passable cells and impassable cells;

a setting processing module, configured to set a roaming control label for each of the passable cells, wherein the roaming control label indicates a preset roaming object is passable;

a control processing module, configured to detect a tag of a passing grid cell from a start point of the roaming path when a roamer roams in the virtual passage, if the passing grid cell is tagged as an impassable cell, then determine to be impassable and select another grid cell for re-detection; if the passing grid cell is tagged as a passable cell, then further detect whether the roamer is the preset roaming object, according to the roaming control label for the passable cell, if not, then determine to be impassable and select another grid cell for re-detection, if yes, then determine to be passable and continue to select the next passing grid cell for detection;

a roaming path generating module, configured to generate a passable roaming path according to a detection result.

Additionally, the roaming path control unit further includes:

a roaming speed control processing module, configured to detect pixel coordinates of a current grid cell and a previous grid cell which are passable;

determine a roaming speed according to the detected pixel coordinates;

determine whether the roaming speed exceeds a preset speed, and control to reduce the roaming speed after the preset speed is determined to be exceeded.

Additionally, the setting processing module is further configured to:

set an attribute value of the roaming control label, wherein the attribute value of 0 indicates to be impassable, the attribute value of 1 indicates to be passable; when it is detected by the control processing module that the roamer is a preset roaming object, further detect the attribute value of the roaming control label, if it is detected that the attribute value of the roaming control label is 1, then determine to be passable and continue to select the next passing grid cell for detection, if it is detected that the attribute value of the roaming control label is 0, then determine to be impassable and select another grid cell for re-detection.

Additionally, the roaming path control unit further includes:

a path section dividing processing module, configured to divide the generated roaming path into a plurality of roaming path sections according to the width of the passage;

setting different resolutions for each roaming path section, and reconstructing a roaming path section according to the resolution of the roaming path section.

Particularly, the virtual passage includes virtual highway, virtual waterway and virtual pedestrian passageway.

As compared with prior art, various embodiments of the present disclosure have the following advantages:

In the virtual reality system according to various embodiments of the present disclosure, a virtual passage is decomposed by a decomposing processing module into various grid cells; the grid cells are tagged by a tagging processing module as passable cells and impassable cells; a roaming control label is set by a setting processing module for each of the passable cells, wherein the roaming control label indicates a preset roaming object is passable; a tag of a passing grid cell is detected by a control processing module from a start point of the roaming path when a roamer roams in the virtual passage, if the passing grid cell is tagged as an impassable cell, then it is determined to be impassable and another grid cell is selected for re-detection; if the passing grid cell is tagged as a passable cell, then whether the roamer is the preset roaming object is further detected, according to the roaming control label for the passable cell, if not, then it is determined to be impassable and another grid cell is selected for re-detection, if yes, then it is determined to be passable and continued to select the next passing grid cell for detection; and a passable roaming path is generated by a roaming path generating module according to a detection result. Therefore, the implementation of the roaming path control by the virtual reality system according to various embodiments of the present disclosure is simple, there is no need to construct complex three-dimensional models, and the requirements for computer hardware are relatively low.

DETAILED DESCRIPTION

Figure 1:
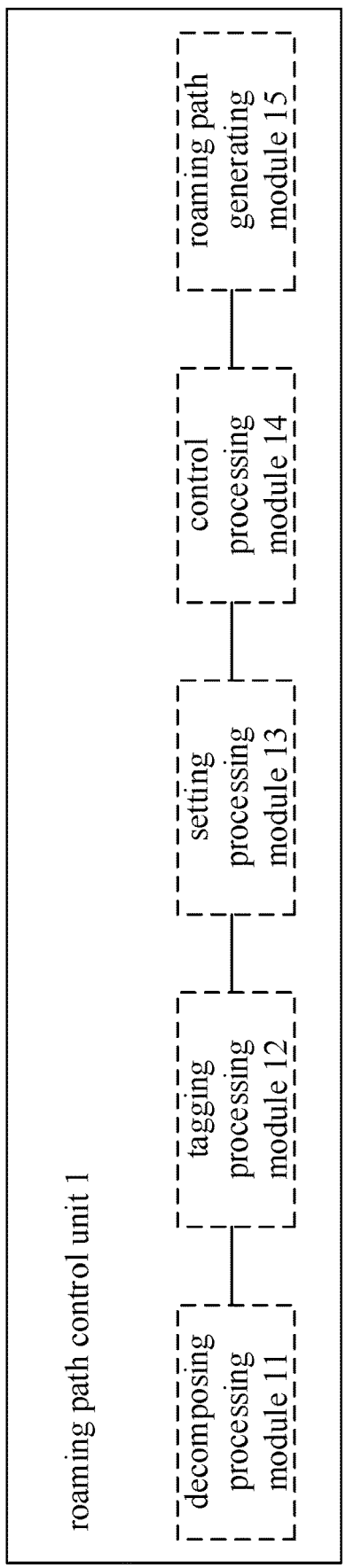
FIG. 1 is a block diagram of a virtual reality system according to a first embodiment of the present disclosure.
Figure 2:
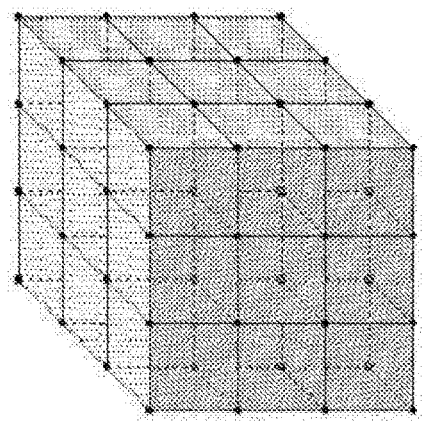
FIG. 2 is a schematic diagram of setting grid cells in a virtual reality system according to an embodiment of the present disclosure.

Refer to FIG. 1, which is a block diagram of a virtual reality system according to an embodiment of the present disclosure, and the virtual reality system in various embodiments of the present disclosure includes a roaming path control unit 1, and further includes other units in practical implementation, which will not be described in detail herein. What's important, the roaming path control unit 1 according to the present disclosure includes a decomposing processing module 11, a tagging processing module 12, a setting processing module 13, a control processing module 14 and a roaming path generating module 15, particularly, the decomposing processing module 11 according to various embodiments of the present disclosure, is configured to decompose a virtual passage into various grid cells, in practical implementation, the virtual passage in various embodiments of the present disclosure can include virtual highway, virtual waterway, virtual pedestrian passageway and the like according to different roamers or roaming scenarios, the virtual passage also can be other passages according to actual circumstances, and the present disclosure is not limited to a specific type of the passage. Additionally, there are many algorithms about roaming path planning, the roaming path planning for a point object is typically based on cell decomposition, and the cell can be a grid cell, a convex polygonal cell or a hierarchical decomposition cell, the virtual passage is decomposed into various grid cells in various embodiments of the present disclosure. For example, as a preferred embodiment and referring to FIG. 2, the grid cell is a grid cell with a side length of L. It should be noted that only regular cubes are schematically shown in FIG. 2 to illustrate the decomposition of virtual passage into grid cells, but the virtual passage in specific implementation is not a regular spatial structure. However, by setting L smaller, the virtual passages can be approximately decomposed into a grid cell structure, which will not be described in detail here;

the tagging processing module 12 according to various embodiments of the present disclosure, is configured to tag the grid cells as passable cells and impassable cells, the grid cells in various embodiments of the present disclosure are classified into passages and barriers, namely, passable cells and impassable cells, where, the passable cells are grid cells which are passable when roaming and impassable cells are grid cells which are impassable when roaming, and other passable cells need to be bypassed to get to the destination, which will not be described in detail here;

the setting processing module 13 according to various embodiments of the present disclosure, is configured to set a roaming control label for each of the passable cells, where the roaming control label indicates a preset roaming object is passable, the roamer in various embodiments of the present disclosure can be different objects, such as human beings, animals, vehicles, ships and the like, different roamers have different roaming passages, for example, a vehicle only can pass on a highway and cannot pass on a pedestrian passageway, and a ship can only pass on a waterway. Therefore, in various embodiments of the present disclosure, the virtual passage is further configured with a roaming control label, for allowing a preset roaming object to pass, for example, the highway is allowable for human beings, animals and vehicles, but the waterway is only allowable for ships. The preset roamers allowable to pass the specific virtual passage can be adjusted according to actual circumstances, which is not limited herein;

the control processing module 14 according to various embodiments of the present disclosure, is configured to detect a tag of a passing grid cell from a start point of the roaming path when a roamer roams in the virtual passage, if the passing grid cell is tagged as an impassable cell, then determine to be impassable and another grid cell is selected for re-detection; if the passing grid cell is tagged as a passable cell, then it is further detected whether the roamer is the preset roaming object, according to the roaming control label for the passable cell, if not, then determine to be impassable and another grid cell is selected for re-detection, if yes, then determine to be passable and the next passing grid cell is continued to select for detection;

the roaming path generating module 15 according to various embodiments of the present disclosure, is configured to generate a passable roaming path according to a detection result, in various embodiments of the present disclosure, only passable grid cell according to the detection result can be taken as the roaming path to pass, and the other impassable grid cell according to the detection result is forbidden to pass.

Figure 3:
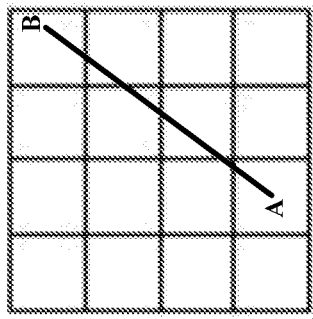
FIG. 3 is a schematic diagram of a roaming path in a virtual reality system according to an embodiment of the present disclosure.

It should be noted that, the roaming path algorithm in the above embodiment can adopt an iterative deepening search algorithm (IDA, Iterative deepening A*) to find a path from start to goal by taking a straight-line distance between a current position and a target as a heuristic function, for example, refer to FIG. 3, a path from A to B is selected, for the selected path, and a tag of a passing grid cell and the roaming control label are detected, and the next grid cell is selected to pass, and the final roaming path is obtained by continuous iterative deepening search, which will not be described in detail here.

Figure 4:
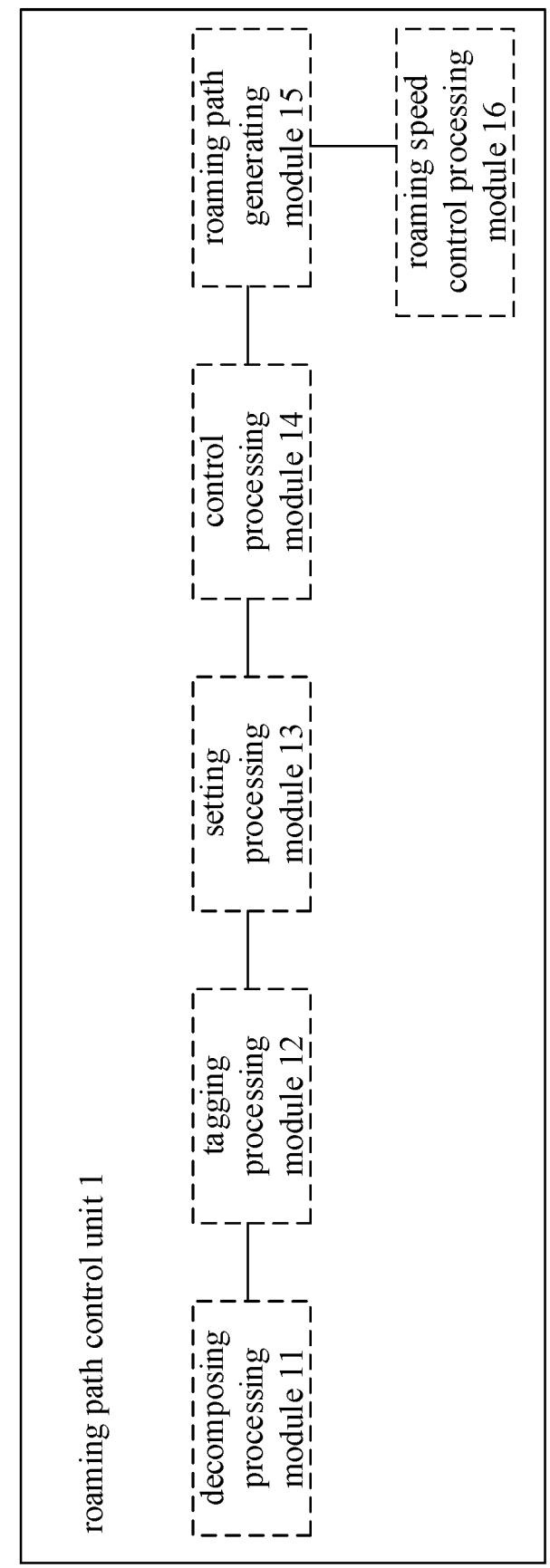
FIG. 4 is a block diagram of a virtual reality system according to a second embodiment of the present disclosure.

Additionally, in a virtual reality system, when roaming is performed following a virtual map, a roaming scenario may skip to a scenario not conforming to the real one, which reduces the user's sense of immersion. In order to solve the skipping phenomenon of roaming scenarios, various embodiments of the present disclosure adopt the following manners: on the one hand, the scale in the virtual reality system is adjusted, so that the actual longitude and latitude coordinates in the real scenario are changed into coordinates of the pixel points in the corresponding virtual map, after doing this, the scenario in the virtual reality system conforms to the proportion of the real scenario; on the other hand, the roaming speed is controlled in various embodiments of the present disclosure, a preset roaming speed is set, refer to FIG. 4, the roaming path control unit 1 further includes a roaming speed control processing module 16, configured to detect pixel coordinates of a current grid cell and a previous grid cell which are passable; determine the roaming speed according to the detected pixel coordinates; determine whether the roaming speed exceeds a preset speed, and control to reduce the roaming speed after the preset speed is determined to be exceeded, so that the change in roaming scenario can be controlled within a certain range, and the probability of skipping roaming scenarios can be reduced.

Additionally, in actual scenarios, whether the roaming path is passable is dynamic, that is, passable roaming path may vary with the change of conditions. In order to implement dynamic roaming path control, a setting processing module 13 is further configured to set an attribute value of the roaming control label in various embodiments of the present disclosure, where, the attribute value of 0 indicates to be impassable, the attribute value of 1 indicates to be passable; when it is detected by a control processing module 14 that the roamer is a preset roaming object, the attribute value of the roaming control label is further detected, if it is detected that the attribute value of the roaming control label is 1, then it is determined to be passable and continued to select the next passing grid cell is for detection, if it is detected that the attribute value of the roaming control label is 0, then it is determined to be impassable and another grid cell is selected for re-detection, that is, the attribute value of the roaming control label can be set according to different conditions, and the roaming path can be dynamically adjusted. For example, as a specific embodiment and referring to FIG. 5, the attribute value of the roaming control label 1 is set as 0, the attribute value of the roaming control label 2 is set as 1, and the attribute value of the roaming control label 3 is set as 1, three roaming control labels are described by way of example here, and are not intended to limit the scope of the present disclosure.

Figures 5, 6:
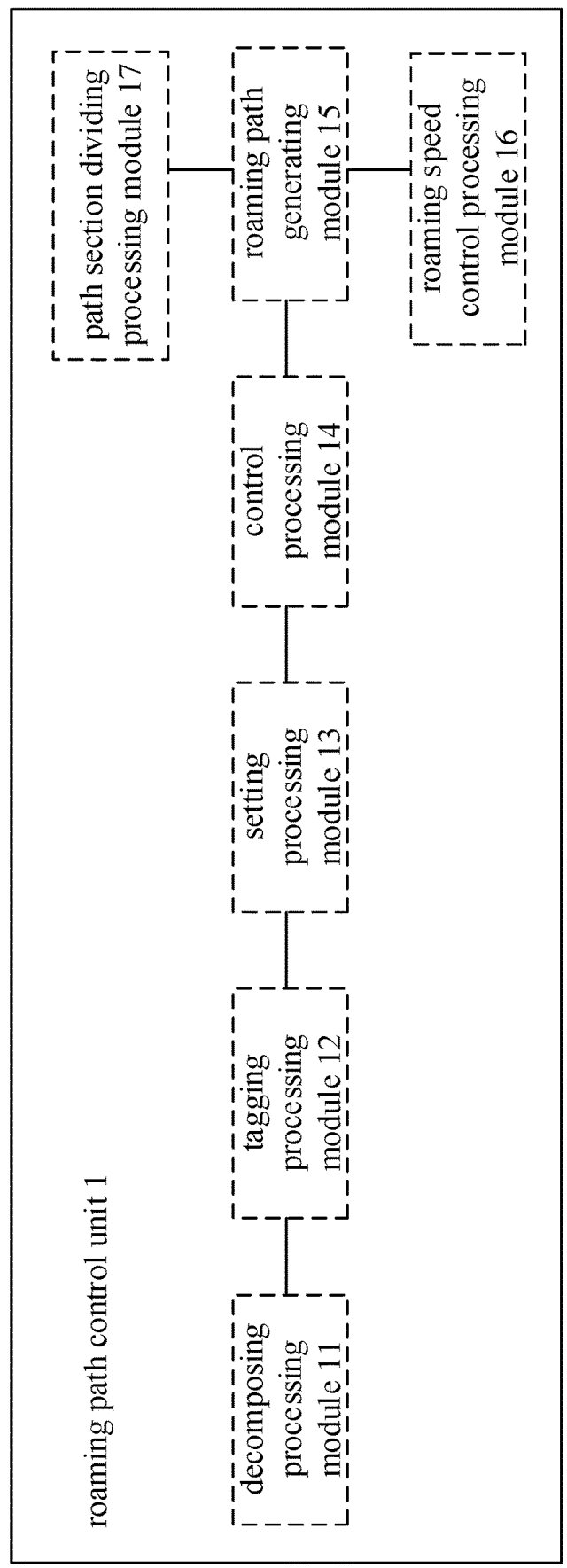
FIG. 5 is a schematic diagram of setting attributes of roaming control labels in a virtual reality system according to an embodiment of the present disclosure.
FIG. 6 is a block diagram of a virtual reality system according to a third embodiment of the present disclosure.

Additionally, in the virtual reality system, when a roamer roams in a virtual passage, shaking vision often occurs when turning around a corner, so that the roaming process is not smooth and the sense of reality is reduced. In order to solve such a problem:

As another preferred embodiment of the present disclosure, and referring to FIG. 6, the roaming path control unit 1 further includes: a path section dividing processing module 17, configured to divide the generated roaming path into a plurality of roaming path sections according to the width of the passage; and setting different resolutions for each roaming path section, and reconstructing a roaming path section according to the resolution of the roaming path section.

In particular, the width of the virtual passage determines the movable range of the roaming path, higher resolution can be adopted for path sections with a wider virtual passage width while lower resolution can be adopted for sections with a narrower virtual passage width, so that the roaming path is more adaptive to the corresponding virtual passage, the roaming path is smoother, that is, in various embodiments of the present disclosure, the same roaming path is divided into different sections, and each section adopts different resolutions, for example, the generated roaming path is divided into two sections, a first section of roaming path is reconstructed according to the passage width of the first roaming path section, likewise, a second section of roaming path is reconstructed according to the passage width of the second roaming path section, after doing this, higher resolution is adopted for path sections with a wider virtual passage width while lower resolution is adopted for sections with a narrower virtual passage width, since resolutions for each roaming path section are adaptive to the width of the corresponding virtual passage, therefore, the roaming path is smoother, the effect of shaking vision when turning a corner is relatively reduced.

Those described above are just preferred embodiments of the present disclosure and are not intended to limit the present disclosure. Any modification, equivalent alternation, and improvement made within the spirit and principle of the present disclosure fall within the scope of the present disclosure.

What is claimed is:

1. A virtual reality system comprising a roaming path control unit, wherein, the roaming path control unit comprises:
    a decomposing processing module, configured to decompose a virtual passage into various grid cells;
    a tagging processing module, configured to tag the grid cells as passable cells and impassable cells;
    a setting processing module, configured to set a roaming control label for each of the passable cells, wherein the roaming control label indicates a preset roaming object is passable;
    a control processing module, configured to detect a tag of a passing grid cell from a start point of the roaming path when a roamer roams in the virtual passage, wherein, if the passing grid cell is tagged as an impassable cell, then determine to be impassable and select another grid cell for re-detection; if the passing grid cell is tagged as a passable cell, then further detect whether the roamer is the preset roaming object, according to the roaming control label for the passable cell, if not, then determine to be impassable and select another grid cell for re-detection, if yes, then determine to be passable and continue to select the next passing grid cell for detection; and
    a roaming path generating module, configured to generate a passable roaming path according to a detection result;
    wherein the roaming path control unit further comprises:
    a path section dividing processing module, configured to divide the generated roaming path into a plurality of roaming path sections according to the width of the passage; and
    set different resolutions for each roaming path section, and reconstruct a roaming path section according to the resolution of the roaming path section.

2. The system according to claim 1, wherein, the setting processing module is further configured to:
    set an attribute value of the roaming control label, wherein the attribute value of 0 indicates to be impassable, the attribute value of 1 indicates to be passable; when it is detected by the control processing module that the roamer is a preset roaming object, further detect the attribute value of the roaming control label, if it is detected that the attribute value of the roaming control label is 1, then determine to be passable and continue to select the next passing grid cell for detection, if it is detected that the attribute value of the roaming control label is 0, then determine to be impassable and select another grid cell for re-detection.

3. The system according to claim 1, wherein, the virtual passage comprises virtual highway, virtual waterway and virtual pedestrian passageway.

* * * * *